United States Patent
Pan et al.

(10) Patent No.: US 9,936,449 B2
(45) Date of Patent: *Apr. 3, 2018

(54) METHOD AND APPARATUS FOR FACILITATING POWER CONSERVATION VIA TIME-GATING IN A WIRELESS COMMUNICATION SYSTEM

(71) Applicant: QUALCOMM Incorporated, San Diego, CA (US)

(72) Inventors: Chengzhi Pan, San Diego, CA (US); Joseph Patrick Burke, Glenview, IL (US); Christian Holenstein, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/284,796

(22) Filed: May 22, 2014

(65) Prior Publication Data

US 2014/0254448 A1 Sep. 11, 2014

Related U.S. Application Data

(62) Division of application No. 12/575,695, filed on Oct. 8, 2009, now Pat. No. 8,874,065.

(Continued)

(51) Int. Cl.
*H04W 52/02* (2009.01)
*H04W 48/16* (2009.01)

(52) U.S. Cl.
CPC ....... *H04W 52/02* (2013.01); *H04W 52/0209* (2013.01); *H04W 52/0235* (2013.01); *H04W 48/16* (2013.01); *Y02D 70/00* (2018.01); *Y02D 70/1222* (2018.01); *Y02D 70/1242* (2018.01); *Y02D 70/1262* (2018.01);

(Continued)

(58) Field of Classification Search
CPC ............ H04W 52/0209; H04W 52/02; H04W 52/0235

See application file for complete search history.

(56) References Cited

U.S. PATENT DOCUMENTS 5,241,542 A 8/1993 Natarajan et al.
5,883,920 A 3/1999 Maruyama et al.
(Continued)

FOREIGN PATENT DOCUMENTS

CN 1285097 A 2/2001
EP 0529269 A2 3/1993
(Continued)

OTHER PUBLICATIONS

International Search Report and Written Opinion—PCT/US2009/060114—ISA/EPO—dated Feb. 4, 2010.
Taiwan Search Report—TW098134394—TIPO—dated Nov. 20, 2012.

Primary Examiner — Yemane Mesfin
Assistant Examiner — Henry Baron
(74) Attorney, Agent, or Firm — Holland & Hart LLP (57) ABSTRACT

The described apparatus and methods may include a receiver configured to receive a control signal, and a controller configured to regulate power consumption of the receiver during intervals of less than one radio frame based on the control signals. The controller may also be configured to regulate power consumption of a transmitter during intervals of less than one radio frame based on the control signal.

28 Claims, 10 Drawing Sheets

Related U.S. Application Data (60) Provisional application No. 61/104,205, filed on Oct. 9, 2008.

(52) U.S. Cl.
CPC ........ *Y02D 70/1264* (2018.01); *Y02D 70/142* (2018.01); *Y02D 70/144* (2018.01); *Y02D 70/146* (2018.01); *Y02D 70/22* (2018.01); *Y02D 70/23* (2018.01)

(56) References Cited

U.S. PATENT DOCUMENTS

| | | |
|---|---|---|
| 6,112,055 A | 8/2000 | Bennett et al. |
| 6,829,468 B2 | 12/2004 | Gandhi et al. |
| 6,876,866 B1 | 4/2005 | Ulupinar et al. |
| 8,855,062 B2 | 10/2014 | Khandekar et al. |
| 2003/0011433 A1* | 1/2003 | Richley .................... 330/276 |
| 2004/0218620 A1 | 11/2004 | Palm et al. |
| 2005/0249137 A1* | 11/2005 | Todd et al. ................ 370/311 |
| 2006/0088008 A1 | 4/2006 | Kim |
| 2008/0192622 A1* | 8/2008 | Scheim et al. ............ 370/210 |
| 2010/0009643 A1* | 1/2010 | Haartsen .......... H04W 52/0251 |
| | | 455/127.5 |
| 2010/0093288 A1 | 4/2010 | Pan et al. |
| 2011/0080925 A1* | 4/2011 | Molina ............... H03M 1/0872 |
| | | 370/538 |

FOREIGN PATENT DOCUMENTS

| | | |
|---|---|---|
| EP | 0952701 A2 | 10/1999 |
| JP | 5207020 A | 8/1993 |
| JP | 8163080 A | 6/1996 |
| KR | 20060036758 A | 5/2006 |
| WO | WO-2002007340 | 1/2002 |
| WO | WO-2008096243 A2 | 8/2008 |

* cited by examiner

METHOD AND APPARATUS FOR FACILITATING POWER CONSERVATION VIA TIME-GATING IN A WIRELESS COMMUNICATION SYSTEM

RELATED APPLICATIONS

The present Application is a division of U.S. patent application Ser. No. 12/575,695 filed on Oct. 8, 2009 entitled "Method and Apparatus for Facilitating Power Conservation Via Time Gating in a Wireless Communication System" that claims priority to Provisional Application No. 61/104,205 entitled "POWER TIME-GATING OF HANDSET FRONT END" filed Oct. 9, 2008, and assigned to the assignee hereof and both of which are hereby expressly incorporated by reference herein.

BACKGROUND

Field

The present disclosure relates generally to wireless communication systems. More specifically, the present disclosure relates to a method and apparatus for facilitating power conservation via time-gating in a wireless communication system.

Introduction

Wireless communication systems are widely deployed to provide various communication services such as voice, video, packet data, messaging, broadcast, etc. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, 3GPP Long Term Evolution (LTE) systems, LTE-Advanced (LTE-A) systems, orthogonal Frequency Division Multiple Access (OFDMA) systems, and Single-Carrier FDMA (SC-FDMA) systems.

Typically, mobile devices utilize power (e.g., battery power) while turned on as well as during periods of communication with a base station and/or other mobile devices via the base station. The amount of power consumed by a mobile device can depend in part on the configuration of the mobile device and/or function (e.g., operation) being performed by the mobile device. Reducing the amount of power utilized by a mobile device is desirable as such reduction can result in extended battery life and decreased cost to use the mobile device and battery in addition to improved overall performance of the mobile device.

Accordingly, there exists a need in the art for a method and apparatus for facilitating power conservation in a wireless communication system by reducing the amount of power utilized by a mobile device.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect of the disclosure, a wireless communication apparatus may include a receiver configured to receive a control signal, and a controller configured to regulate power consumption of the receiver during intervals of less than one radio frame based on the control signal.

According to another aspect of the disclosure, a method may include receiving a control signal, and regulating power consumption of a receiver during intervals of less than one radio frame based on the control signal.

According to a further aspect of the disclosure, an apparatus may include means for receiving a control signal, and means for regulating power consumption of a receiver during intervals of less than one radio frame based on the control signal.

According to yet a further aspect of the disclosure, a computer program product may include a computer-readable medium that includes code for receiving a control signal, and code for regulating power consumption of a receiver during intervals of less than one radio frame based on the control signal.

According to yet a further aspect of the disclosure, a wireless communication apparatus may include a receiver configured to receive a control signal, and a controller configured to regulate power consumption of a transmitter during intervals of less than one radio frame based on the control signal.

According to yet a further aspect of the disclosure, a method may include receiving a control signal, and regulating power consumption of a transmitter during intervals of less than one radio frame based on the control signal.

According to yet a further aspect of the disclosure, an apparatus may include means for receiving a control signal, and means for regulating power consumption of a transmitter during intervals of less than one radio frame based on the control signal.

According to yet a further aspect of the disclosure, a computer program product may include a computer-readable medium that includes code for receiving a control signal, and code for regulating power consumption of a transmitter during intervals of less than one radio frame based on the control signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system," "apparatus" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced are new releases of UMTS that use E-UTRA, which employs OFDMA on the downlink and SC-FDMA on the uplink. UTRA, E-UTRA, UMTS, LTE, LTE-Advanced, and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Additionally, in the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Figure 1:
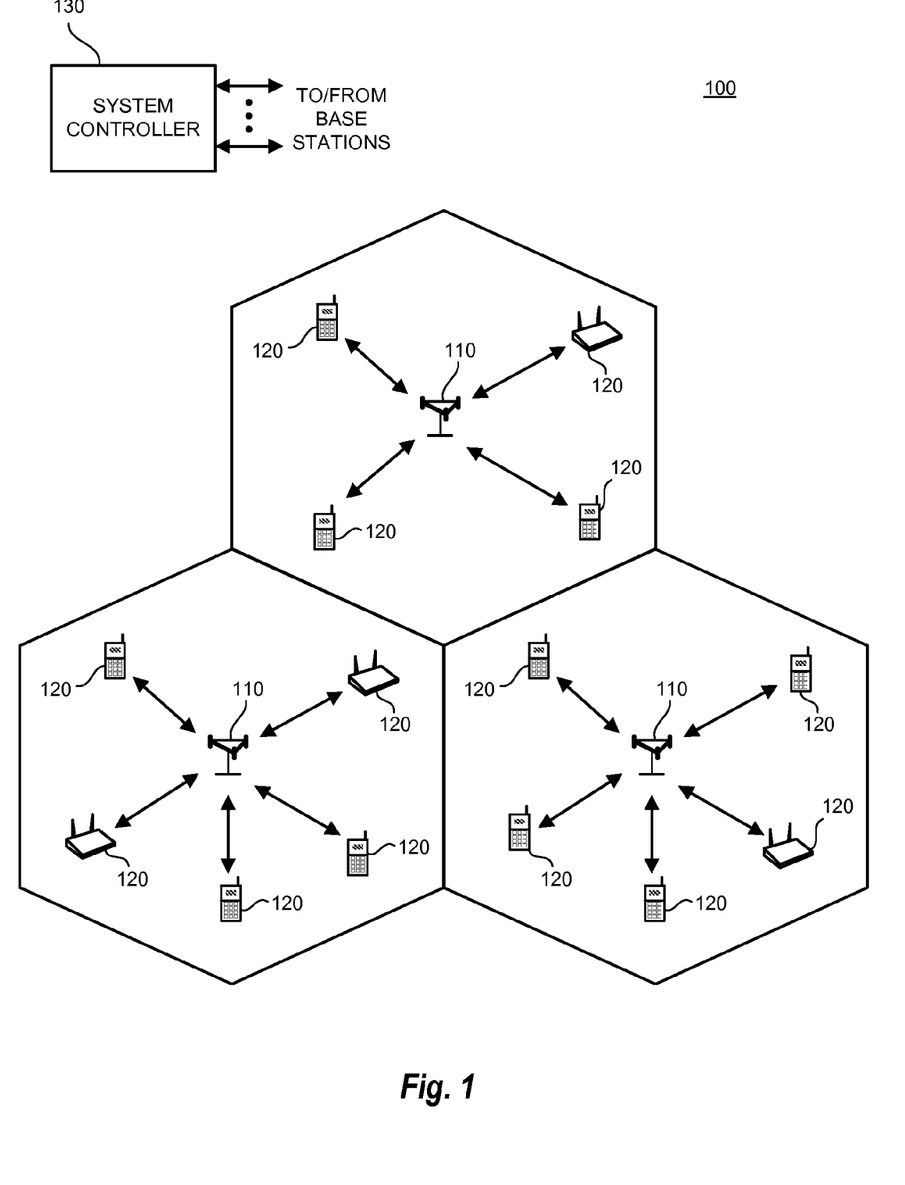
FIG. 1 illustrates aspects of a wireless communication system.

FIG. 1 shows a wireless communication system 100, which may be a 3GPP LTE E-UTRA system. System 100 may include base stations 110 and other network entities described by 3GPP. A base station may be a fixed station that communicates with the access terminals. Each base station 110 may provide communication coverage for a particular geographic area. To improve network capacity, the overall coverage area of a base station may be partitioned into multiple (e.g., three) smaller areas. Each smaller area may be served by a respective base station subsystem. In 3GPP, the term "cell" can refer to the smallest coverage area of a base station and/or a base station subsystem serving this coverage area.

A system controller 130 may include a mobility management entity (MME) and a serving gateway (S-GW), and may couple to a set of base stations and provide coordination and control for these base stations. S-GW may support data services such as packet data, Voice-over-Internet Protocol (VoIP), video, messaging, etc. MME may be responsible for path switching between a source base station and a target base station at handover. System controller 130 may couple to a core and/or data network (e.g., the Internet) and may communicate with other entities (e.g., remote servers and terminals) coupled to the core/data network.

Access terminals 120 may be dispersed throughout the network, and each access terminal may be stationary or mobile. An access terminal may communicate with a base station via downlink and uplink. The downlink (or forward link) refers to the communication link from the base station to the access terminal, and the uplink (or reverse link) refers to the communication link from the access terminal to the base station. In FIG. 1, a solid line with double arrows indicates active communication between a base station and an access terminal.

Figure 2:
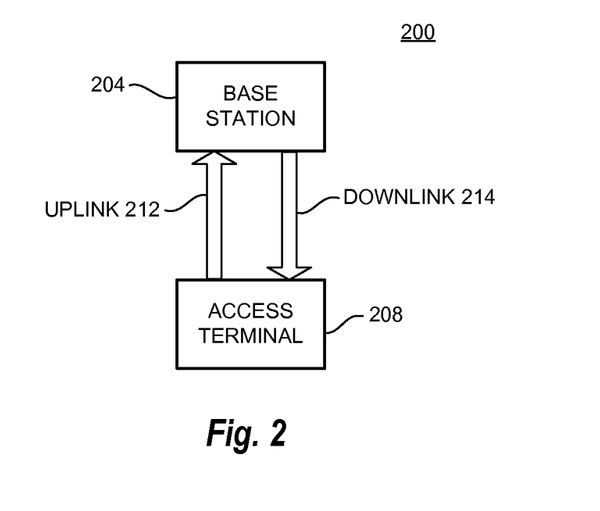
FIG. 2 illustrates a communications system including an uplink and a downlink between a base station and an access terminal.

FIG. 2 illustrates a system 200 including an uplink 212 and a downlink 214 between a base station 204 and an access terminal 208. The base station 204 and the access terminal 208 may correspond to the base station 110 and the access terminal 120 shown in FIG. 1. The uplink 212 refers to transmissions from the access terminal 208 to the base station 204; and the downlink 214 refers to transmissions from the base station 204 to the access terminal 208.

Figure 3:
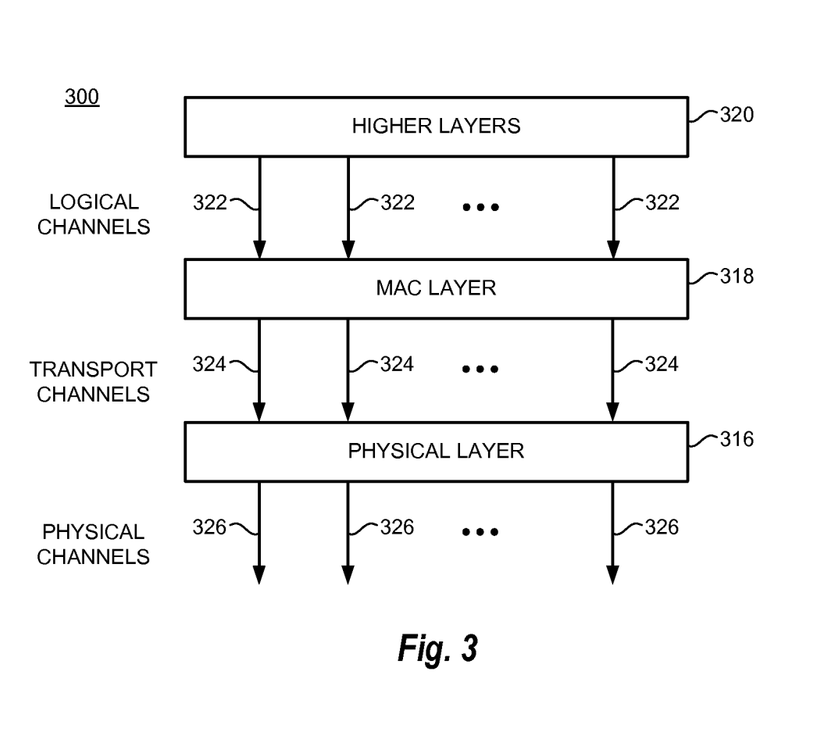
FIG. 3 illustrates some aspects of a protocol stack for a communications system.

FIG. 3 illustrates some aspects of a protocol stack for a communications system. Both, the base station 204 and the access terminal 208 may include the protocol stack 300 illustrated in FIG. 3. The protocol stack may include a physical layer (PHY) 316, a Medium Access Control (MAC) 318, and higher layers 320.

Each protocol receives service data units (SDUs) from a higher sublayer/layer and provides protocol data units (PDUs) to a lower sublayer/layer. For example, the MAC layer 318 receives data from the higher layers 320 via one or more logical channels 322. The higher layers 320 may include packet data convergence protocol (PDCP) and radio link control (RLC).

The MAC layer 318 may perform various functions such as mapping between logical channels 322 and transport channels 324, multiplexing and demultiplexing of various PDUs for logical channels 322 into/from transport blocks for transport channels 324, error correction through Hybrid Automatic Repeat Request (HARM), traffic volume measurement reporting, priority handling between logical channels 322 of an access terminal, priority handling between access terminals via dynamic scheduling, transport format selection, padding, etc.

The physical layer 316 may be configured to provide multiple physical control channels 326. The access terminal 204 may be configured to monitor this set of control channels. The physical layer 316 may also offer data transport services via the physical channels 326. Some the physical channels for downlink signal transmissions may be Physical Downlink Control Channel (PDCCH), Physical Hybrid ARQ Indicator Channel (PHICH), and Physical Downlink Shared Channel (PDSCH). Some of the physical channels for uplink signal transmissions may be Physical Uplink Control Channel (PUCCH), Physical Uplink Shared Channel (PUSCH), and Physical Random Access Channel (PRACH).

Figure 4:
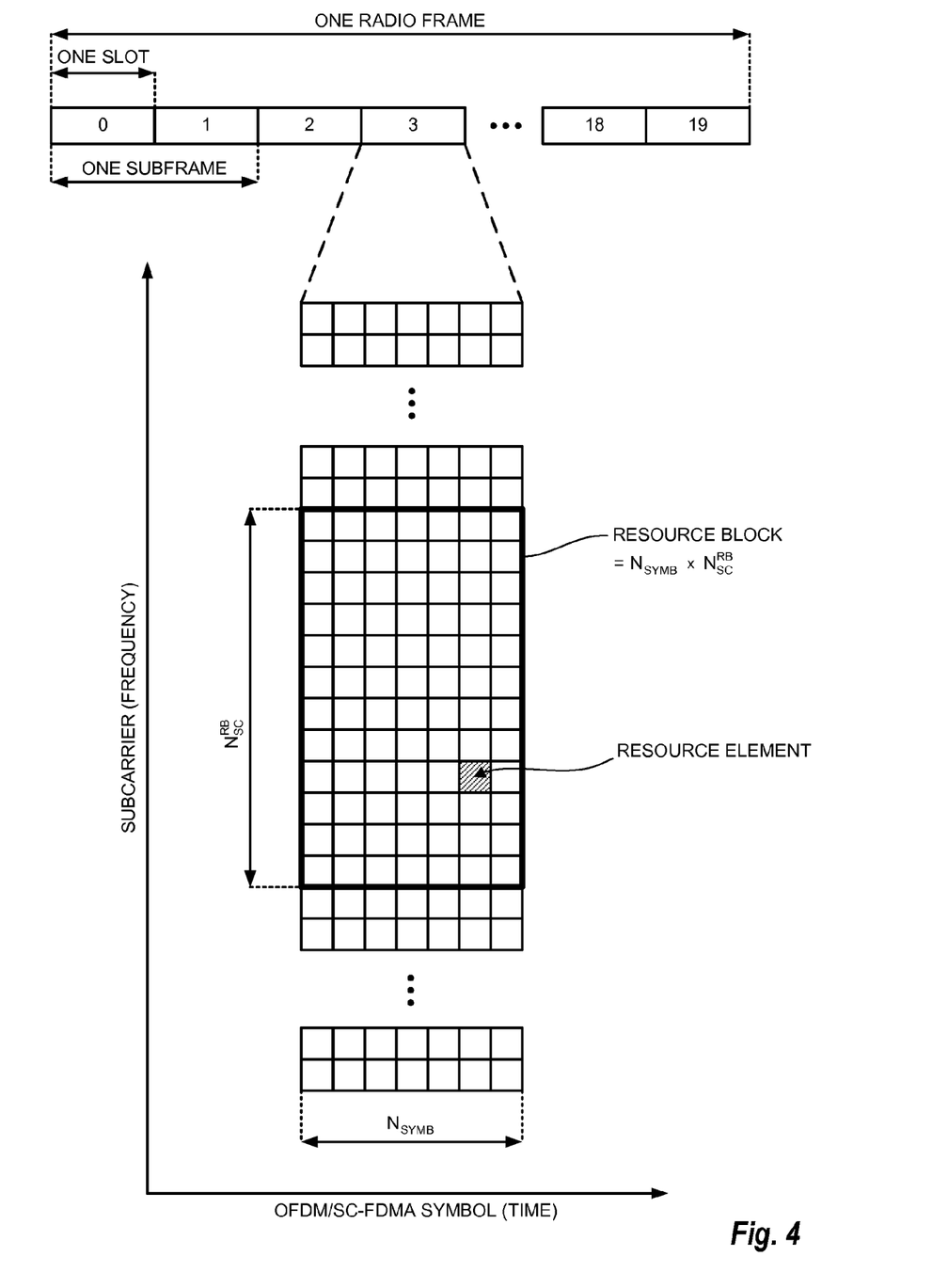
FIG. 4 illustrates a radio frame structure and a resource grid showing a resource block and resource elements.

The system 100 may use orthogonal OFDMA for the downlink and SC-FDMA for the uplink. The basic idea underlying OFDM is the division of the available frequency spectrum into several subcarriers. To obtain a high spectral efficiency, the frequency responses of the subcarriers are overlapping and orthogonal. In the system 100, the OFDMA downlink transmissions and the uplink transmissions may be organized into radio frames, where one radio frame is approximately 10 ms in duration. It should be noted that the 10 ms radio frame is exemplary, and that aspects of the disclosure may be applied to other radio frames having different durations and frame structures. The frame structure may be applicable to both frequency division duplex (FDD) (the application of frequency-division multiplexing to separate outward and return signals) and time division duplex (TDD) (the application of time-division multiplexing to separate outward and return signals). As shown in FIG. 4, each radio frame is 10 ms long and consists of 20 slots of 0.5 ms, numbered from 0 to 19. A subframe is defined as two consecutive slots where subframe i consists of slots 2i and 2i+1. The subframe may be referred to as a transmission time interval (TTI). For FDD, 10 subframes are available for downlink transmission and 10 subframes are available for uplink transmissions in each 10 ms interval. Uplink and downlink transmissions are separated in the frequency domain. For TDD, a subframe is either allocated to downlink or uplink transmission. Subframe 0 and subframe 5 may always be allocated for downlink transmission.

The signal in each slot may be described by a resource grid of $N_{SC}^{RB}$ subcarriers and $N_{SYMB}$ symbols, which may be OFDM symbols for downlink or SC-FDMA symbols for uplink. Each symbol may be approximately 71.4 us in duration. In case of multi-antenna transmission from the base station 110, there may be one resource grid defined per antenna port. An antenna port may be defined by a downlink reference signal (DLRS) that is unique within the cell. Each element in the resource grid for an antenna port p may be called a resource element and is uniquely identified by the index pair (k,l) where k and l are the indices in the frequency and time domains, respectively. One, two, four, or more antenna ports may be supported. A physical resource block may be defined as $N_{SYMB}$ consecutive symbols in the time domain and $N_{SC}^{RB}$ (e.g., 12) consecutive subcarriers in the frequency domain. A resource block thus consists of $N_{SYMB} \times N_{SC}^{RB}$ resource elements.

Data transmitted over the system 100 may be categorized as either non-real-time (NRT) data or real-time (RT) data. Examples of NRT data include data transmitted during web browsing by an access terminal or text-messaging to an access terminal, while an example of RT data is voice communication between access terminals.

Data packets (both NRT and RT) are transmitted from the base station to the access terminals in the PDSCH. Various modulation and coding schemes (MCSs) are supported on the PDSCH. Modulation schemes include quadrature phase-shift keying (QPSK) and quadrature amplitude modulation (QAM), such as 16-QAM and 64-QAM. Various coding rates, used for error correction, may be used. The combination of modulation schemes and coding rates may result in a large number, e.g., 30, of possible MCSs.

Uplink and downlink control signaling from the base station may be transmitted in the PDCCH and the PHICH. The PDCCH may generally serve as a downlink control channel. The PDCCH downlink control signaling may include resource scheduling information. The PHICH may be used to indicate to an access terminal on a downlink whether an uplink packet was correctly received at the base station by transmitting feedback in the form of an acknowledgment signal (ACK) when the packet is correctly received and a negative-acknowledgement signal (NAK) when the packet is incorrectly received.

When scheduling resources, the base station may transmit a scheduling grant on the PDCCH that grants to a particular access terminal an amount of physical resources in the downlink and/or the uplink. For an uplink scheduling grant, this amount of physical resources is constructed of a number of uplink resource blocks. The base station may then transmit an ACK or NACK as appropriate to the access terminal once that granted set of uplink resource blocks passes so the access terminal can know whether or not it must re-transmit its uplink data.

Figure 5:
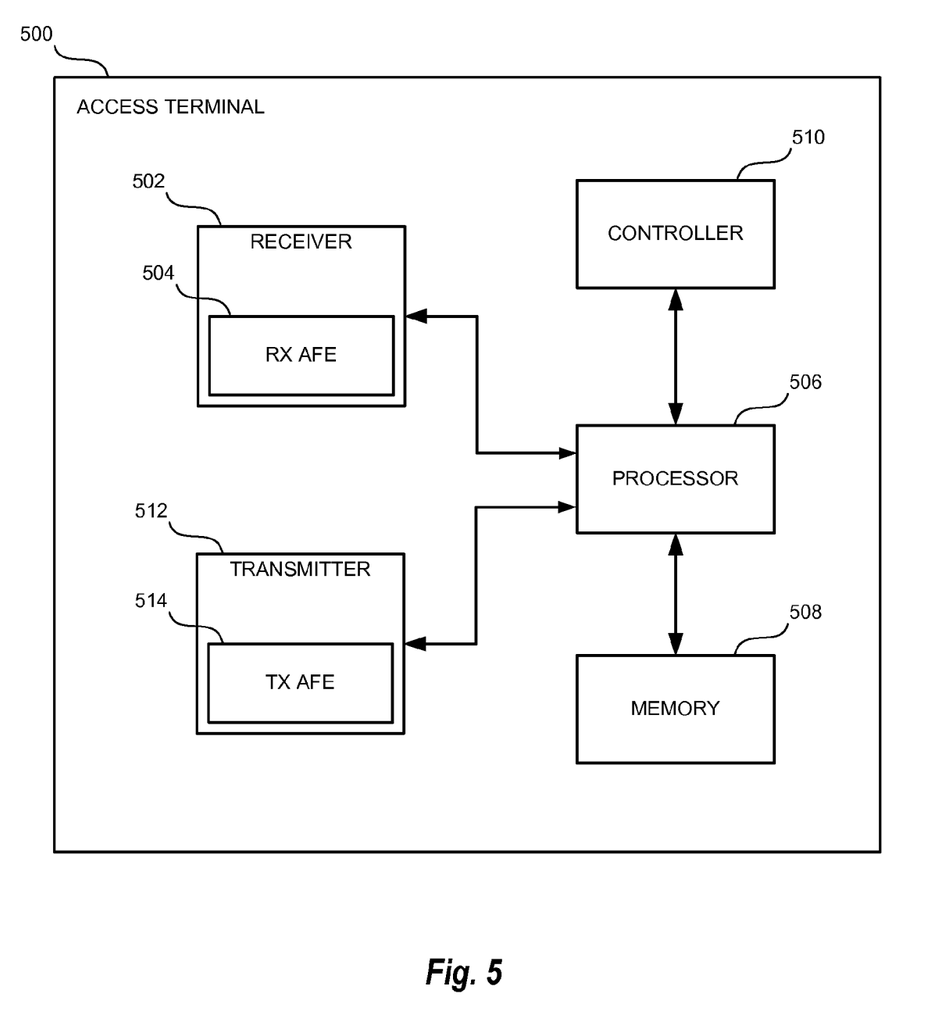
FIG. 5 illustrates an example of an access terminal that facilitates power conservation in a wireless communication system.

FIG. 5 is an illustration of an access terminal that facilitates power conservation in a wireless communication system. The access terminal 500 may correspond to the one of the access terminals 120 shown in FIG. 1. As shown in FIG. 5, the access terminal 500 may include a receiver 502 that receives multiple signals from, for instance, one or more receive antennas (not shown), performs typical actions on (e.g., filters, amplifies, downconverts, etc.) the received signals, and digitizes the conditioned signals to obtain samples. The receiver 502 may be a single receiver, as shown, or include multiple receivers for each separate communication protocol. The receiver 502 may also include an analog front end (RX AFE) 504 that is responsible for performing the necessary analog signal processing before providing the received signal to processor 506. For example, the RX AFE 504 may include a demodulator that can demodulate received symbols from each signal. As part of, or in addition to, the demodulator, the RX AFE 504 may include a low noise amplifier (LNA), mixer, base band filter (BBF), analog to digital converter (ADC), and a phase-locked loop-based local oscillator (PLL/LO). These components, as well as others, may constitute the RX AFE 504 of the receiver 502. The receiver 502 may also include digital back-end (DBE) components, such as digital signal buffers, digital low pass filter (DLPF), decimator, fast Fourier transformer (FFT), synchronizer, equalizer, demodulator, decoder, and so on. These components may also be time-gated.

The processor 506 can be a processor dedicated to analyzing information received by the receiver 502 and/or generating information for transmission by a transmitter 512, a processor that controls one or more components of the access terminal 500, and/or a processor that both analyzes information received by the receiver 502, generates information for transmission by the transmitter 512, and controls one or more components of the access terminal 500.

The transmitter 512 may be a single transmitter, as shown, or include multiple transmitters for each separate communication protocol. The transmitter 512 may also include an analog front end (TX AFE) 514 that is responsible for performing the necessary analog signal processing before providing the signal to the antenna (not shown) for transmission to, for instance, a satellite, a base station, a web/internet access point name (APN), and another access terminal, etc. For example, the TX AFE 514 may include a modulator that can modulate signals received from the processor. As part of, or in addition to, the modulator, the TX AFE 514 may include a spectrum shaping filter, a digital to analog converter (DAC), mixer, BBF, power amplifier, and a PLL/LO. These components, as well as others, may constitute the TX AFE 514 of the transmitter 512.

The receiver 502 and the transmitter 512 may further be operatively coupled, either directly or via the processor 506 (as shown), to a controller 510. The controller 510 may regulate the power consumption of the receiver 502 and the transmitter 512 by powering down and powering up the RX AFE 504 and the TX AFE 514 based on a specific time-gating pattern. The controller 510 may derive respective time-gating patterns for the RX AFE 504 and the TX AFE 514 from various factors, such as resource scheduling information received from a base station, time-frequency resource usage by the access terminal 500, and other factors (e.g., control processing delay, analog block wake-up time, local oscillator frequency, etc.). Each respective time-gating pattern allows the controller 510 to temporally regulate the power consumption of the receiver 502 and the transmitter 512 by controlling the symbols (resource elements) and subframes during which the majority or all of the components of the receiver 502 and transmitter 512 are powered on and off. Other DBE components in the receiver 502 may also be fully or partially time-gated in a manner similar to that of the RX AFE 504. When time-gating, the controller 510 may configure a specific wake-up time (i.e., time period during which a component is powered on) for each respective component in the RX AFE 504 and the TX AFE 514 such that the access terminal 500 may efficiently receive and transmit signals. It should be noted that the various components in the RX AFE 504 and the TX AFE 514 can be powered on or off separately and the wake-up time can be of sub-symbol duration (e.g. 5-10 us). For example, the wake-up timer may be set to 10 us for the LNA, 5 us for the ADC, DAC, LO drivers, and baseband amplifiers, and 150 us for the synthesizer.

The access terminal 500 may execute time-gating based on information received in a radio frame. For example, the access terminal 500 may receive the radio frame from the base station 110. The first symbol, the first two, or the first three symbols of the radio frame may include control information indicating whether or not the incoming transmission is intended for the access terminal 500. Alternatively, the access terminal 500 may have previously received from the base station 110 a schedule assigning various downlink resource elements to the access terminal 500, which may also indicate whether or not the incoming transmission is intended for the access terminal 500. The schedule may be transmitted via PDCCH. The controller 510 may process the control information or the schedule and determine whether or not the incoming transmission is intended for the access terminal 500. If the controller 510 determines that the radio frame is intended for the access terminal 500, it may maintain power to the RX AFE 504 at least for the duration of the radio frame so as to allow the access terminal 500 to receive and process the remainder of the radio frame. If, however, the controller 510 determines from the control information or the schedule that the radio frame is not intended for the access terminal 500, then the controller may generate a time-gating pattern and provide power to the RX AFE 504 according to the time-gating pattern such that the RX AFE 504 is powered on only when pertinent information is expected to be received.

Figure 6:
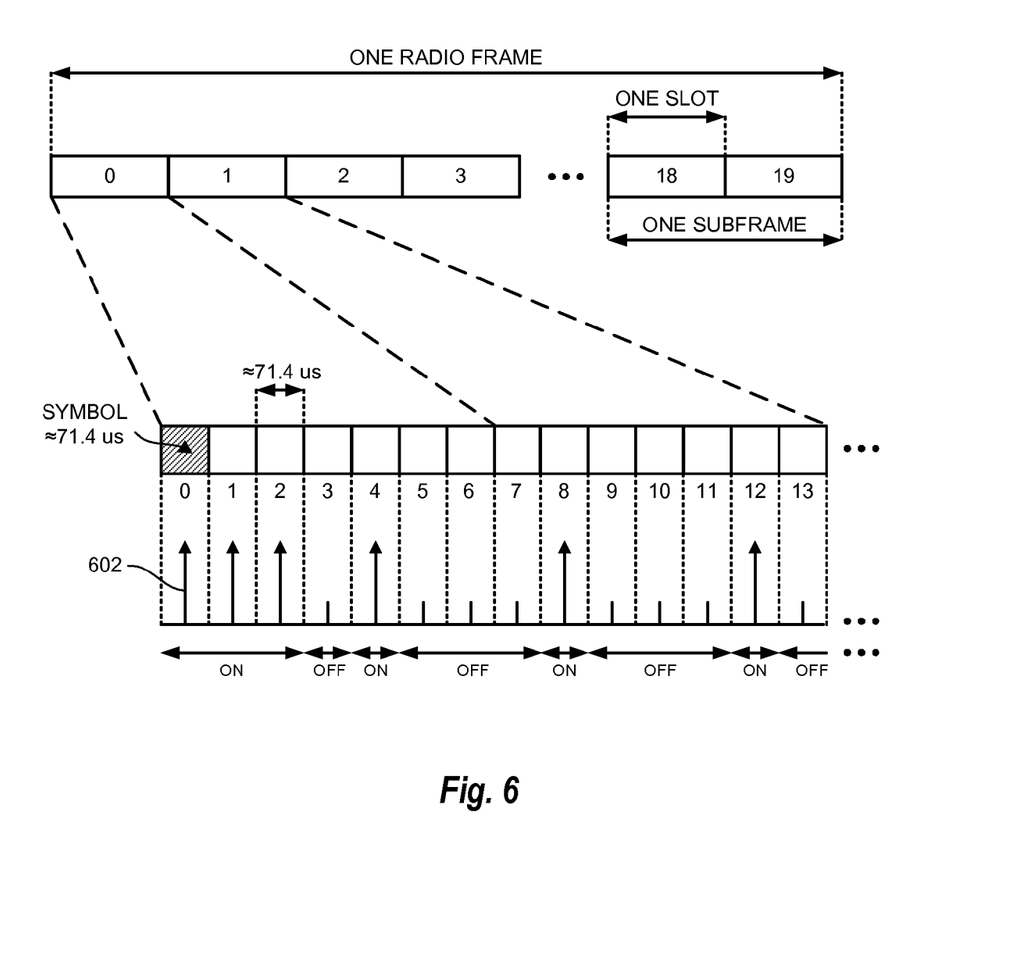
FIG. 6 illustrates an example of a time-gating pattern for a receiver.

An example of such a time-gating pattern for the receiver 502 is shown in FIG. 6. Elements 602 indicate symbols containing pertinent information for the access terminal 500. Each symbol may be approximately 71.4 us in duration. For example, elements 602 within symbols 0, 1, 2 may contain control information from which the controller 510 may generate the time-gating pattern. In this example, the controller 510 determined that the radio frame is not intended for the access terminal 500, and as such, generated a time-gating pattern allowing the RX AFE 504 to be on only when receiving a pilot signal from the base station 110 (i.e. during symbols 4, 8, 12, etc.). The components of the RX AFE 504 may then proceed to power on to receive the symbols having the pilot signals during symbols 4, 8, 12, etc., and to power down for every other symbol 3, 5, 6, 7, 9, 10, 11, 13, etc., so as not to idle inactively. In this manner, the controller 510 may conserve power for the access terminal 500. Alternatively, the components of the RX AFE 504 may also power down for some or all of the symbols having the pilot signals. This alternative time-gating pattern may provide a greater level of power conservation at the cost of channel estimation quality. It should also be noted that there may be some delay associated with processing the received control information, which may cause the RX AFE 504 to be powered on during at least a portion of symbol 3 because of the processing delay.

The controller 510 may also operate in various different modes, such as persistent assignment mode and scheduled assignment mode. In persistent assignment mode, when the first three symbols are received and decoded, and the controller 510 determines that resources are persistently assigned once every few (e.g., ten) radio frames, the controller 510 may then power off the RX AFE 504 during all of the remaining eleven symbols in the current subframe for the current radio frame, assuming no processing delay. In scheduled assignment mode, where the RX AFE 504 may be powered on during every PDCCH, the controller 510 may configured not to receive the pilots in the second slot. In this case, the RX AFE 504 may be powered off during the entire second slot and the remaining part of the first slot.

The controller 510 may likewise generate a time-gating pattern for the TX AFE 514 of the transmitter 512. For example, the access terminal 500 may receive from the base station 110 a schedule assigning various uplink resource elements to the access terminal 500. The schedule may be transmitted via PUCCH. The schedule may also include control information indicating whether the access terminal 500 is receiving a data or voice package from another user, and, if a data or voice package is not incoming, then the access terminal 500 may signal the base station 110 to maintain a connection with the network. The controller 510 may process the control information and determine when and for how long to transmit to the base station 110. If the controller 510 determines that a data or voice package is incoming, it may maintain power to the TX AFE 514 at least for the duration of the data or voice package. The controller 510 may also power off the TX AFE 514 and the RX AFE 504 according to a time-gating pattern during a real-time voice call or during use of data service when voice and/or data packages are not continuously incoming or being transmitted. Such may be the case when a resource scheduler in the base station 110 configures the voice and data traffic for the access terminal 500 to be time-bursty (i.e., not receiving or transmitting in continuous sub-frames). If, however, the controller 510 determines from the control information that there is no incoming data or voice package and that the access terminal 500 is required to transmit status information to the base station 110 during a particular subframe, then the controller may generate a time-gating pattern and provide power to the TX AFE 514 according to the time-gating pattern such that the TX AFE 514 is powered on only during the transmission of that one subframe, or any other subframes during which the access terminal 500 is required to transmit information to the base station 110.

Figure 7:
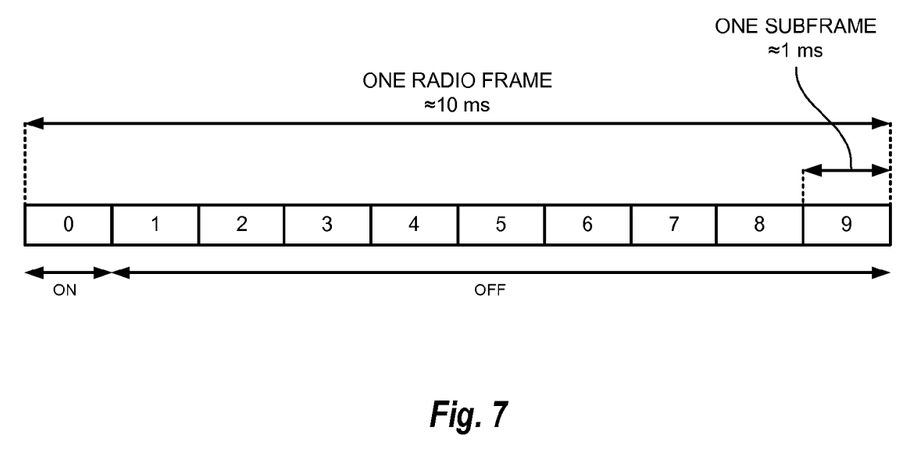
FIG. 7 illustrates an example of a time-gating pattern for a transmitter.

An example of such a time-gating pattern is shown in FIG. 7. In this example, the controller 510 determined that there is no incoming data or voice package and that the access terminal 500 is required to transmit status information to the base station 110 during the first subframe of a radio frame. As such the controller 510 generated a time-gating pattern allowing the TX AFE 514 to be on only during the first subframe 0 when transmitting status information to the base station 110. The components of the TX AFE 514 may then proceed to power on to transmit the status information during subframe 0, and to power down for every other subframe, so as not to idle inactively. In this manner, the controller 510 may facilitate power conservation by the transmitter 512.

The access terminal 500 may additionally include memory 508 that is operatively coupled to the processor 506 and that can store data to be transmitted, received data, information related to available channels, data associated with analyzed signal and/or interference strength, information related to an assigned channel, power, rate, or the like, and any other suitable information for estimating a channel and communicating via the channel. Memory 508 can additionally store protocols and/or algorithms associated with estimating and/or utilizing a channel (e.g., performance based, capacity based, etc.).

It will be appreciated that the data store (e.g., memory 508) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 508 of the subject systems and methods is intended to comprise, without being limited to, these and any other suitable types of memory.

The controller 510 can further control the acquisition and storage in the memory 508, and direct communications with base stations, satellites and devices on other networks, by interfacing with the transmitter 514 via the processor 506.

Although depicted as being separate from the processor 506, it is to be appreciated that the controller 510 can be part of the processor 506 or multiple processors (not shown). Furthermore, the functions of the controller 510 may be integrated in an application layer, a data stack, an HTTP stack, at the operating system (OS) level, in an internet browser application, or in an application specific integrated circuit (ASIC).

Figure 8:
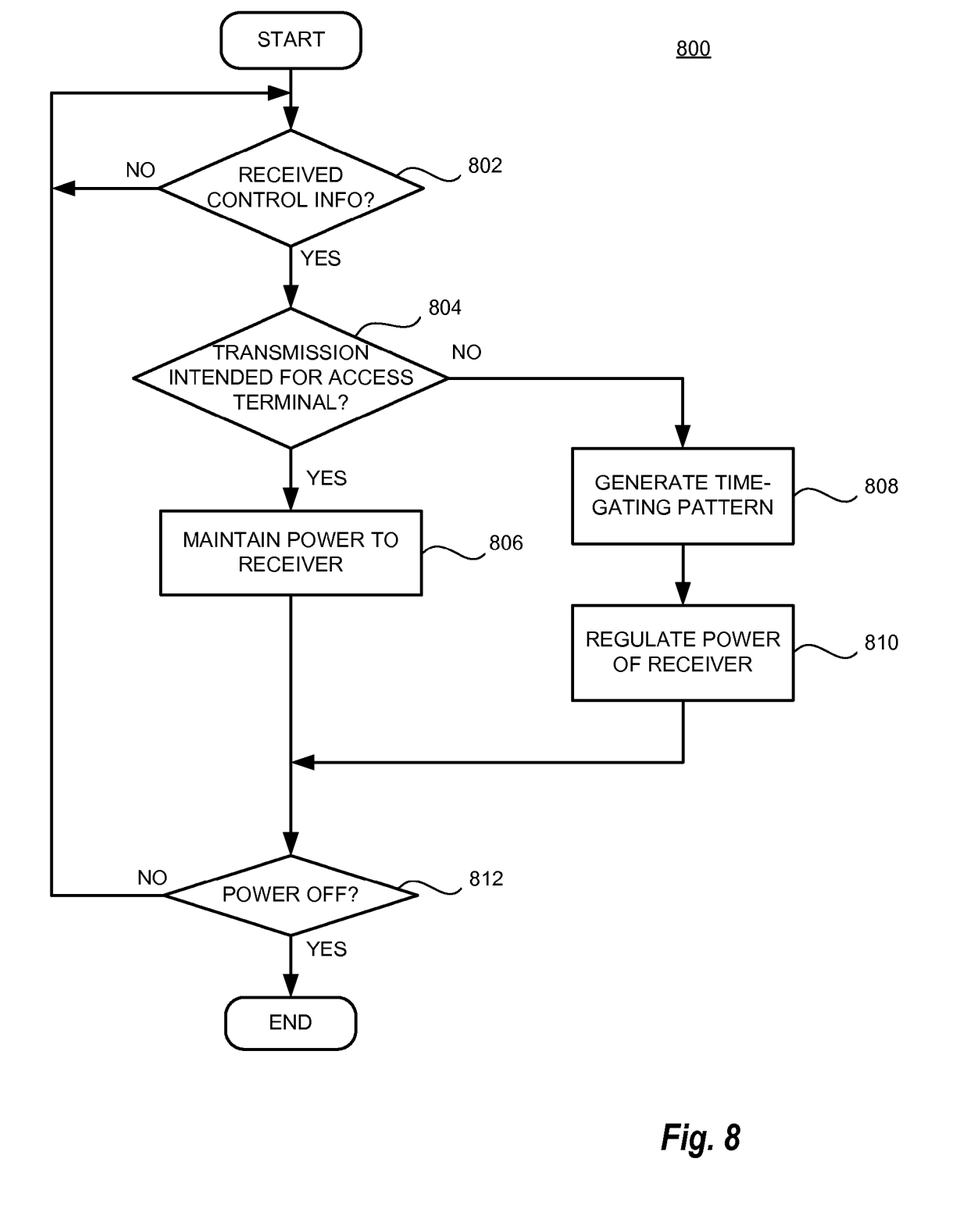
FIG. 8 is a flow chart illustrating an example of a process for facilitating power conservation in a receiver.

FIG. 8 is a flow chart illustrating an example of a process for facilitating power conservation in a receiver. The process may be implemented in the access terminals 500. As shown in FIG. 8, in block 802, a determination may be made as to whether control information has been received. If control information has been received, the process may continue to block 804, otherwise the process may return to block 802. For example, the access terminal 500 may receive control information or a schedule from base station 110.

In block 804, a determination may be made as to whether an incoming transmission, such as a radio frame, is intended for the access terminal. If the transmission is intended for the access terminal, then the process may proceed to block 806, otherwise, the process may proceed to block 808. For example, upon decoding the control information or the schedule, the controller 510 may determine whether the transmission or the frame is intended for the access terminal 500.

In block 806, constant power may be provided and/or maintained to the receiver such that the receiver may receive the whole of the transmission intended for the access terminal. Thereafter, the process may proceed to block 812.

In block 808, a time-gating pattern may be generated, and the process may proceed to block 810. For example, the controller 510 may generate a time-gating pattern that regulates when the RX AFE 504 is powered on and off.

In block 810, power of the receiver may be regulated based on the generated time-gating pattern, and the process may proceed to block 812. For example, the controller 510 may regulate power consumption of the receiver during intervals of less than one radio frame (e.g., approximately the duration of one symbol) by powering off the RX AFE 504 during those intervals.

In block 812 a determination may be made as to whether the access terminal 500 is powered off. If the access terminal 500 is not powered off, the process may return to block 802. Otherwise, the process may end.

Figure 9:
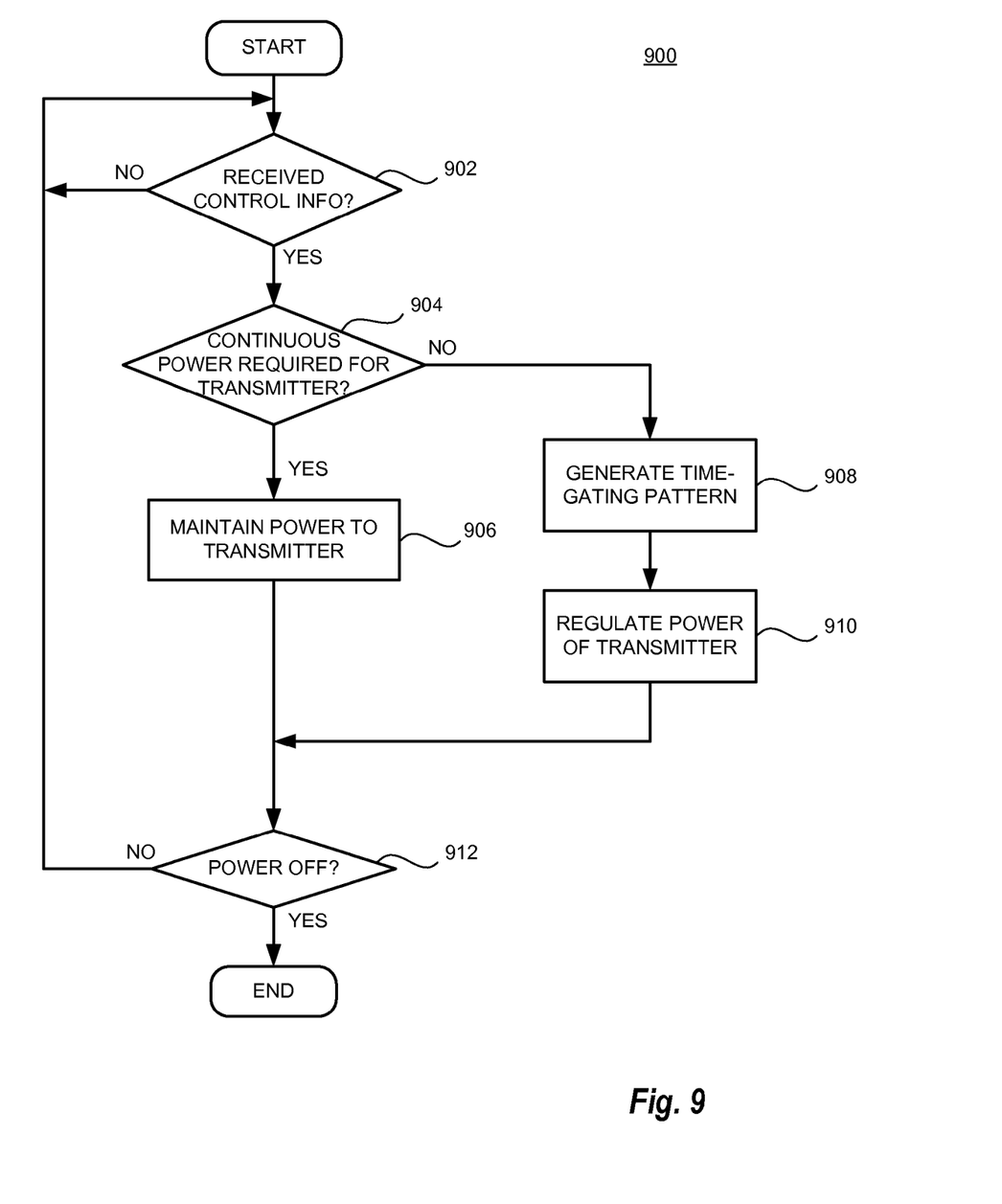
FIG. 9 is a flow chart illustrating an example of a process for facilitating power conservation in a transmitter.

FIG. 9 is a flow chart illustrating an example of a process for facilitating power conservation in a transmitter. The process may be implemented in the access terminals 500. As shown in FIG. 9, in block 902, a determination may be made as to whether control information has been received. If control information has been received, the process may continue to block 904, otherwise the process may return to block 902. For example, the access terminal 500 may receive control information or a schedule from base station 110.

In block 904, a determination may be made as to whether the transmitter is required to be continuously powered on. If the transmitter is required to be continuously powered, then the process may proceed to block 906, otherwise, the process may proceed to block 908.

In block 906, constant power may be provided and/or maintained to the transmitter such that the transmitter may be used to transmit any pertinent information. Thereafter, the process may proceed to block 912.

In block 908, a time-gating pattern may be generated, and the process may proceed to block 910. For example, the controller 510 may generate a time-gating pattern that regulates when the TX AFE 514 is powered on and off.

In block 910, power of the transmitter may be regulated based on the generated time-gating pattern, and the process may proceed to block 912. For example, the controller 510 may regulate power consumption of the transmitter during intervals of less than one radio frame (e.g., approximately the duration of one subframe) by powering on the TX AFE 514 during those intervals.

In block 912 a determination may be made as to whether the access terminal 500 is powered off. If the access terminal 500 is not powered off, the process may return to block 902. Otherwise, the process may end.

Figure 10:
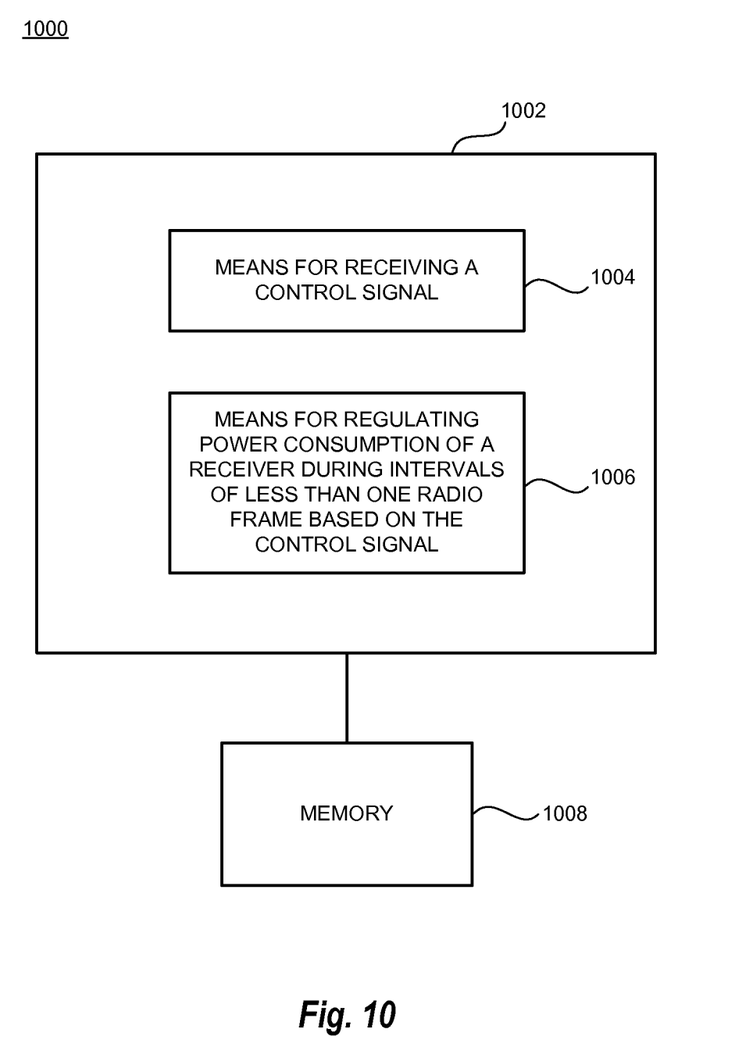
FIG. 10 is an illustration of an example system that facilitates power conservation in a receiver.

FIG. 10 is an illustration of an example system 1000 that facilitates power conservation in a receiver. For example, system 1000 can reside at least partially within an access terminal, etc. It is to be appreciated that system 1000 is represented as including functional blocks, which can be functional blocks that represent functions implemented by a processor, software, or combination thereof (e.g., firmware). System 1000 includes a logical grouping 1002 of means that can act in conjunction. For instance, logical grouping 1002 can include: means for receiving a control signal 1004; and means for regulating power consumption of a receiver during intervals of less than one radio frame based on the control signal 1006. Additionally, system 1000 can include a memory 1008 that retains instructions for executing functions associated with the means 1004 through 1006. While shown as being external to memory 1008, it is to be understood that one or more of the means 1004 through 1006 can exist within memory 1008.

Figure 11:
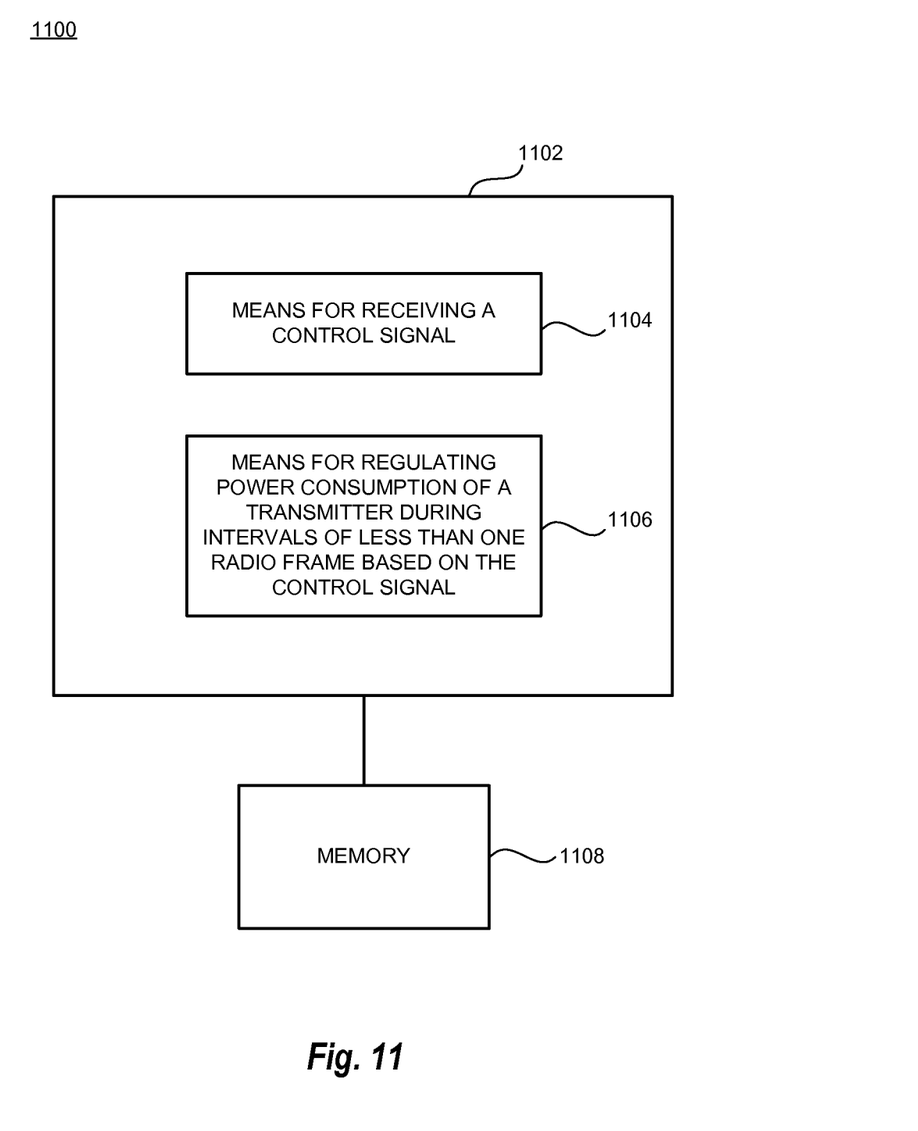
FIG. 11 is an illustration of an example system that facilitates power conservation in a transmitter.

FIG. 11 is an illustration of an example system 1100 that facilitates power conservation in a transmitter. For example, system 1100 can reside at least partially within an access terminal, etc. It is to be appreciated that system 1100 is represented as including functional blocks, which can be functional blocks that represent functions implemented by a processor, software, or combination thereof (e.g., firmware). System 1100 includes a logical grouping 1102 of means that can act in conjunction. For instance, logical grouping 1102 can include: means for receiving a control signal 1104; and means for regulating power consumption of a transmitter during intervals of less than one radio frame based on the control signal 1106. Additionally, system 1100 can include a memory 1108 that retains instructions for executing functions associated with the means 1104 through 1106. While shown as being external to memory 1108, it is to be understood that one or more of the means 1104 through 1006 can exist within memory 1108.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A wireless communication apparatus, comprising:
   a receiver configured to receive a control signal comprising information in a radio frame;
   a transmitter; and
   a controller, operatively coupled to the receiver and the transmitter, configured to generate a time-gating pattern based on the information in the control signal to regulate power consumption of the transmitter during subframes of the radio frame, wherein the power consumption of the transmitter is regulated by defining, using the time-gating pattern, a plurality of subframes when the transmitter is to be powered on and a plurality of subframes when the transmitter is to be powered down.

2. The wireless communication apparatus of claim 1, wherein each subframe is less than one radio frame in duration.

3. The wireless communication apparatus of claim 2, wherein each subframe has a duration of approximately 1 ms.

4. The wireless communication apparatus of claim 1, wherein the time-gating pattern indicates a temporal location of the subframes.

5. The wireless communication apparatus of claim 4, wherein the temporal location of the subframes depends on the control signal.

6. The wireless communication apparatus of claim 1, wherein, in between at least two of the subframes, the transmitter is powered off for a period of time less than one radio frame.

7. The wireless communication apparatus of claim 6, wherein, during at least one of the subframes, the transmitter is powered on for a period of time less than one radio frame.

8. A method, comprising:
   receiving a control signal comprising information in a radio frame;
   generating a time-gating pattern based on the information in the control signal; and
   regulating power consumption of a transmitter during subframes of the radio frame, wherein the power consumption of the transmitter is regulated by defining, using the time-gating pattern, a plurality of subframes when the transmitter is to be powered on and a plurality of subframes when the transmitter is to be powered down.

9. The method of claim 8, wherein each subframe is less than one radio frame in duration.

10. The method of claim 9, wherein each subframe has a duration of approximately 1 ms.

11. The method of claim 8, wherein the time-gating pattern indicates a temporal location of the subframes.

12. The method of claim 11, wherein the temporal location of the subframes depends on the control signal.

13. The method of claim 8, wherein, in between at least two of the subframes, the transmitter is powered off for a period of time less than one radio frame.

14. The method of claim 13, wherein, during at least one of the subframes, the transmitter is powered on for a period of time less than one radio frame.

15. An apparatus comprising:
   means for receiving a control signal comprising information in a radio frame;
   means for generating a time-gating pattern based on the information in the control signal; and
   means for regulating power consumption of a transmitter during subframes of the radio frame, wherein the power consumption of the transmitter is regulated by defining, using the time-gating pattern, a plurality of subframes when the transmitter is to be powered on and a plurality of subframes when the transmitter is to be powered down.

16. The apparatus of claim 15, wherein each subframe is less than one radio frame in duration.

17. The apparatus of claim 16, wherein each subframe has a duration of approximately 1 ms.

18. The apparatus of claim 15, wherein the time-gating pattern indicates a temporal location of the subframes.

19. The apparatus of claim 18, wherein the temporal location of the subframes depends on the control signal.

20. The apparatus of claim 15, wherein, in between at least two of the subframes, the transmitter is powered off for a period of time less than one radio frame.

21. The apparatus of claim 20, wherein, during at least one of the subframes, the transmitter is powered on for a period of time less than one radio frame.

22. A computer program product, comprising:
   a non-transitory computer-readable medium comprising:
   code for receiving a control signal comprising information in a radio frame;
   code for generating a time-gating pattern based on the information in the control signal; and
   code for regulating power consumption of a transmitter during subframes of the frame, wherein the power consumption of the transmitter is regulated by defining, using the time-gating pattern, a plurality of subframes when the transmitter is to be powered on and a plurality of subframes when the transmitter is to be powered down.

23. The computer program product of claim 22, wherein each subframe is less than one radio frame in duration.

24. The computer program product of claim 23, wherein each subframe has a duration of approximately 1 ms.

25. The computer program product of claim 22, wherein the timegating pattern indicates a temporal location of the subframes.

26. The computer program product of claim 25, wherein the temporal location of the subframes depends on the control signal.

27. The computer program product of claim 22, wherein, in between at least two of the subframes, the transmitter is powered off for a period of time less than one radio frame.

28. The computer program product of claim 27, wherein, during at least one of the subframes, the transmitter is powered on for a period of time less than one radio frame.

* * * * *